US010282565B2

(12) United States Patent
Abnett (10) Patent No.: US 10,282,565 B2
(45) Date of Patent: May 7, 2019

(54) COMPUTER SECURITY ENVIRONMENT (71) Applicant: Albert C Abnett, Nevada, OH (US)

(72) Inventor: Albert C Abnett, Nevada, OH (US)

(*) Notice: Subject to any disclaimer, the term of this patent is extended or adjusted under 35 U.S.C. 154(b) by 0 days.

(21) Appl. No.: 15/657,167

(22) Filed: Jul. 23, 2017

(65) Prior Publication Data
US 2019/0026503 A1 Jan. 24, 2019

(51) Int. Cl.
G06F 21/86 (2013.01)
G06F 21/60 (2013.01)
G06F 21/78 (2013.01)

(52) U.S. Cl.
CPC .............. *G06F 21/86* (2013.01); *G06F 21/60* (2013.01); *G06F 21/604* (2013.01); *G06F 21/78* (2013.01)

(58) Field of Classification Search
CPC ........ G06F 21/86; G06F 21/60; G06F 21/604; G06F 21/78
See application file for complete search history.

(56) References Cited

U.S. PATENT DOCUMENTS

| | | | | |
|---|---|---|---|---|
| 2005/0134471 A1* | 6/2005 | Kovach | .................. | G08B 13/08 340/686.1 |
| 2006/0109114 A1* | 5/2006 | Watts | ..................... | G08B 13/00 340/568.1 |
| 2007/0257104 A1* | 11/2007 | Owen | ..................... | G06F 21/32 235/380 |
| 2012/0151121 A1* | 6/2012 | Braga | ..................... | G06F 21/79 711/103 |
| 2015/0127902 A1* | 5/2015 | Shah | ..................... | G06F 3/0689 711/114 |
| 2016/0358457 A1* | 12/2016 | Nye | ........................ | G08B 29/06 |

* cited by examiner

*Primary Examiner* — Matthew Smithers
(74) *Attorney, Agent, or Firm* — David G. Herold (57) ABSTRACT A computer security environment that delays physical access to a computer system, detects intrusion attempts upon that computer system, using one or more intrusion sensors that each detects an intrusion condition, and finally destroys nonvolatile memory within the computer system to deny access to sensitive data stored within the nonvolatile memory upon detection of an intrusion. The system supports selection of an intrusion profile defining the intrusion conditions armed to detect an intrusion and destroy the nonvolatile memory.

15 Claims, 6 Drawing Sheets

COMPUTER SECURITY ENVIRONMENT

CROSS-REFERENCE TO RELATED APPLICATIONS

This application is a continuation-in-part of Application No. 62/494,059, filed 25 Jul. 2016.

BACKGROUND OF THE INVENTION

The present invention is directed to a computer security environment, in general, and more particularly to a computer security environment that denies an intruder's access to nonvolatile computer memory, containing sensitive data, by destroying the nonvolatile memory. Sensitive data is data that can compromise the owner, in some way, if that data is exposed.

As computers have become more pervasive, they increasingly contain sensitive information that can compromise the owner, if that data falls into the wrong hands. Examples of sensitive data would be business data, product design data, attorney client privileged data, to name a few.

Serious data breeches regularly result from web attacks on internet connected computers and consequently many security related inventions address security from internet attacks. Data may be encrypted and otherwise protected when it is stored in computer memory and not actively being created or modified.

While data is actively being created or modified, it generally exists in the clear, not encrypted or otherwise obscured. The current invention is directed at protecting sensitive computer data that exists in the clear and is not otherwise protectable by encryption or obscuration. Without protection from physical access, attackers can gain access to and potentially copy sensitive data stored in nonvolatile computer memory.

SUMMARY OF THE INVENTION

In the preferred embodiment of the present invention, the computer security environment comprises an enclosure that defines the perimeter of the security environment, the protected computer system is disposed within the enclosure, the computer system includes nonvolatile memory composed of memory chips with one or more data lines and a power input. One or more intrusion sensors detect intrusion conditions and send a detection signal to a controller. An over-voltage generator applies an over-voltage condition to the one or more data lines and to the power input of the nonvolatile memory to destroy the memory upon receiving a destruct signal. A user interface selects an intrusion profile defining the detection signals armed to produce the destruct signal. A controller in communication with the user interface, the one or more intrusion sensors and the over-voltage generator is operable to evaluate the detections signals against the intrusion profile and produce a destruct signal.

In another embodiment of the current invention, a self-destructing thumb drive comprises a nonvolatile memory for storing sensitive data, the nonvolatile memory having one or more data lines. A computer interface operable to allow a computer system to store data in the nonvolatile memory. An over-voltage generator for generating an over-voltage condition on said one or more data lines upon receipt of a destruct signal. A switch accessible from the surface of the thumb drive, for entering a destruction request sequence. And a trigger mechanism, connected to the switch and in communication with the over-voltage generator, operable to detect the destruction request sequence and send the destruct signal.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The object of this invention is to keep sensitive data, stored in non volatile memory in use within a computer system, from falling into the wrong hands due to a physical security breech, by destroying the nonvolatile memory. That is, an apparatus and method to detect a security breech and respond by permanently damaging the nonvolatile memory.

Figure 1:
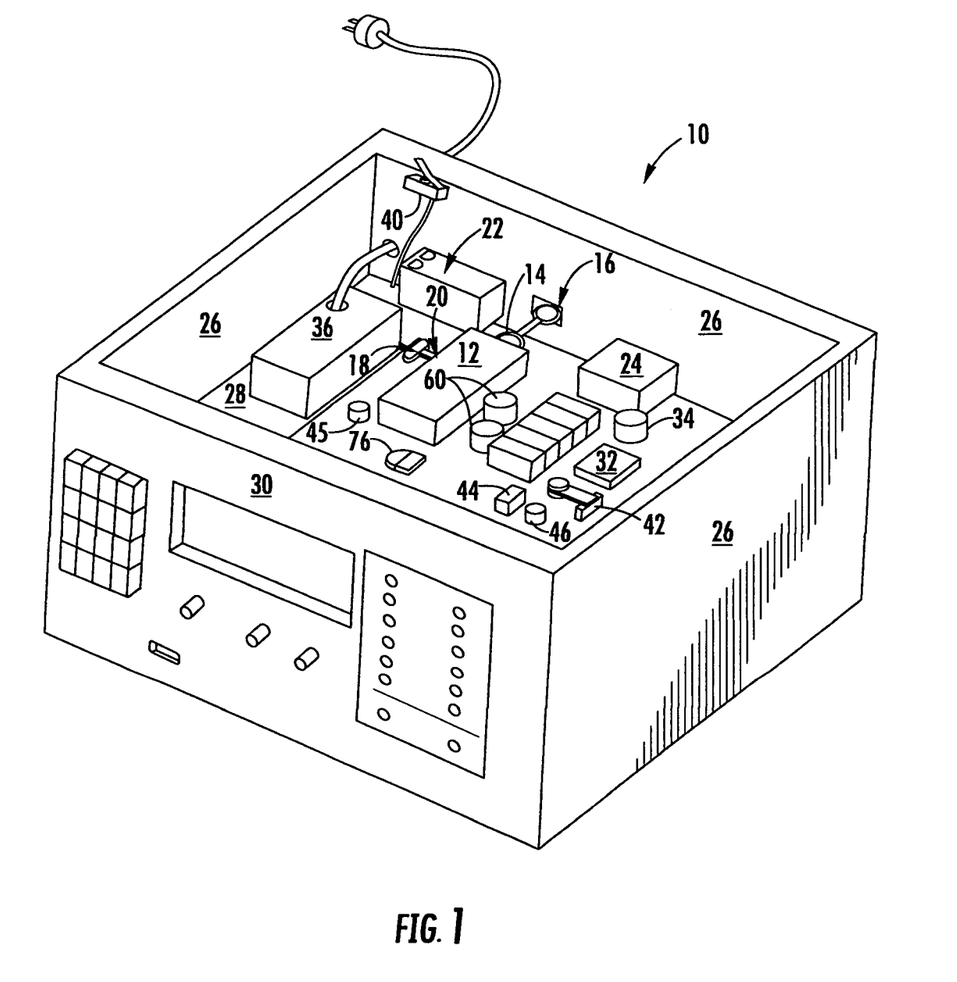
FIG. 1 is a perspective view of the preferred embodiment of the current invention.

FIG. 1 provides a perspective view of a computer security environment 10 according to an exemplary embodiment of the present subject matter. Computer security environment 10 is provided by way of example only and is not intended to limit the present subject matter in any aspect. Thus, the present subject matter may be used with other security environment configurations, e.g., that define a different computer arrangement and/or different intrusion sensors or arrangement of those sensors and/or a different user interface as presented to the user via the front panel.

In this embodiment, a computer system is protected by the security environment. The protected computer system is an Intel Compute Stick 12 comprising a CPU, RAM, Flash memory, an HDMI display interface, USB interfaces, Wi-Fi, and Bluetooth. The flash memory is nonvolatile memory. Nonvolatile memory comprises memory implemented in one or more semiconductor chips, which may be flash memory chips. Nonvolatile memory maintains memory contents across power cycles. The computer uses nonvolatile memory to store files that may contain sensitive data. Sensitive data is data that needs to be protected. Nonvolatile memory chips are electronic parts that have data lines that convey data into and out of the chip. The nonvolatile memory chips also have power inputs that expect a specific constant voltage during operation.

To make an operational computer system, a monitor (not shown) is connected to the protected computer system through HDMI display interface 14 and HDMI extension cable 16, a keyboard and mouse (not shown) are connected through RF interface 18 plugged into USB interface 20 and a network connection is made through the on-board WiFi interface. Peripheral components such as the monitor, keyboard and mouse are not part of the protected computer system. Compute Stick 12 runs programs which may create or access sensitive data stored in nonvolatile memory. The computer system is powered by battery 22 through power supply 24 which supplies power to Compute Stick 12.

Security environment 10 has an enclosure comprising sides 26, bottom 28, front panel 30 and a lid (not shown) that covers security environment 10. The enclosure limits physical access to security environment 10 and forms a perimeter to be defended. An intrusion of security environment 10 is a breech of the enclosure or an attempt to gain access to the contents of security environment 10.

Security environment 10 intrusion is detected by deploying one or more intrusion sensors within security environment 10 or surrounding security environment 10. When an intrusion sensor detects an intrusion it is an intrusion condition. Intrusion conditions are communicated to processor 32 via detection signals. Processor 32 evaluates the detection signals against an intrusion profile. The intrusion profile defines the intrusion conditions currently used to generate a destruct signal.

Microswitch 40 is an intrusion sensor that detects an opening in security environment 10 when the lid is open or removed. Microswitch 40 sends a detection signal to processor 32.

Vibration sensor 42 is an intrusion sensor that detects a high vibration condition within security environment 10. A high vibration condition could be caused by someone drilling through the lid of security environment 10. Vibration sensor 42 sends a detection signal to processor 32.

Tilt sensor 44 is an intrusion sensor that detects when security environment 10 is not sitting level. A tilt detection could result if security environment 10 was lift up to look for an entry point. Tilt sensor 44 sends a detection signal to processor 32.

Figure 2:
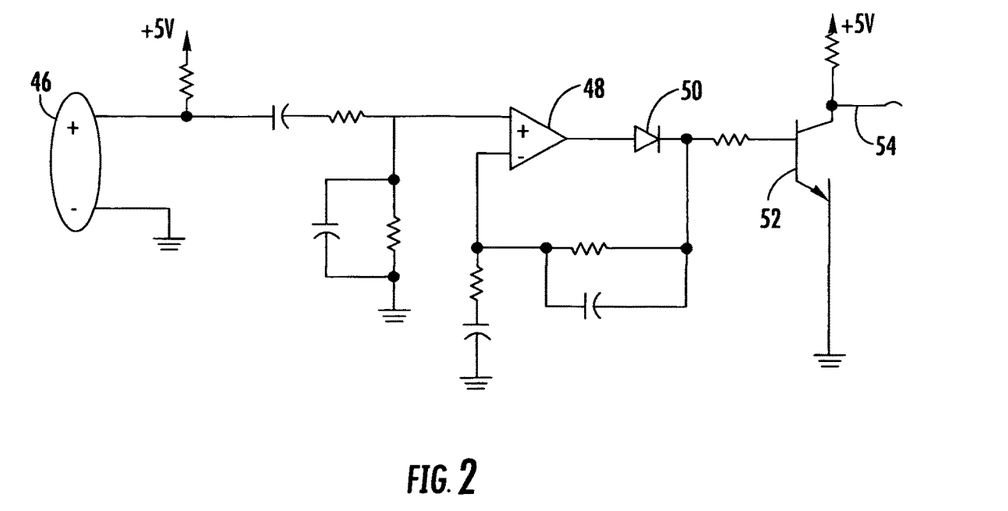
FIG. 2 depicts a schematic of the microphone and conditioning circuitry of the noise detection intrusion sensor.

Microphone 46 is an intrusion sensor that detects a high noise level within security environment 10. Referring to FIG. 2, electret microphone 46 picks up sound within security environment 10, which is amplified by op amp 48 in a three-pole low-pass filter configuration. Diode 50 rectifies the filtered sound output and transistor 52 digitizes the detection signal which is sent to processor 32 via output 54. The microphone circuit is most sensitive to low frequencies present for intrusions involving sawing or drilling into the enclosure.

Photosensor 45 is an intrusion sensor that detects light in security environment 10. When light is detected in security environment 10, a detection signal is sent to processor 32.

A low-battery detector (not shown) is an intrusion sensor because the power has been removed for long enough to discharge the battery. The low-battery threatens the system because once the battery completely discharges, the system is not longer protected. The low-battery condition triggers a detection signal to processor 32.

Figure 3:
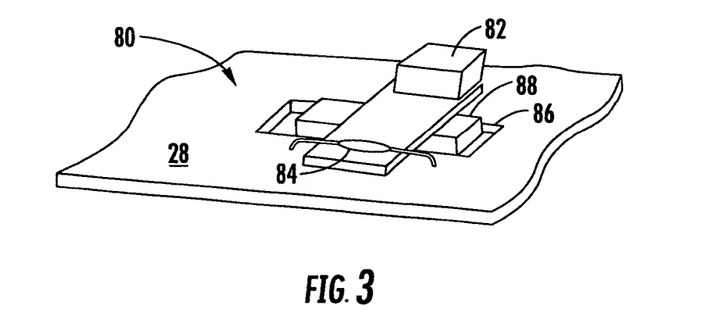
FIG. 3 depicts the location intrusion sensor that detects movement.

Location sensor 80 is an intrusion sensor that detects movement of security environment 10. Referring to FIG. 3 permanent magnet 82 and reed switch 84 straddle slot 86 cut into security environment bottom plate 28. Ferrous metal block 88, secured to a surface on which security environment 10 sits (not shown), confines the flux from magnet 82 such that reed switch 84 is open. If security environment 10 is moved off ferrous metal block 88, the flux from permanent magnet 82 activates reed switch 84 and sends a detection signal to processor 32.

A remote destruction trigger may be implemented by placing a cellphone within audio range of microphone 46. Processor 32 is programmed to identify a particular ring tone. Requiring multiple calls, three for example, within a limited time, a minute for example, reduces the possibility of a false trigger. When the triggering sequence is detected by processor 32, the destruct signal is generated.

Processor 32 generates a destruct signal based on the current intrusion conditions evaluated against the intrusion profile. The intrusion profile determines which intrusion conditions are armed to generate a destruction signal. Some of the intrusion conditions cause the destruct signal to be generated immediately upon detection. In particular, the case intrusion condition generated by microswitch 40 and the low-battery condition cause the destruct signal to be generated immediately. The remaining intrusion conditions have a delay such that beeper 34 is activated upon the detection of the intrusion condition, but the destruct signal is delayed by a time that allows an operator with a security code to cancel the current intrusion condition before the destruct signal is generated.

Figure 4:
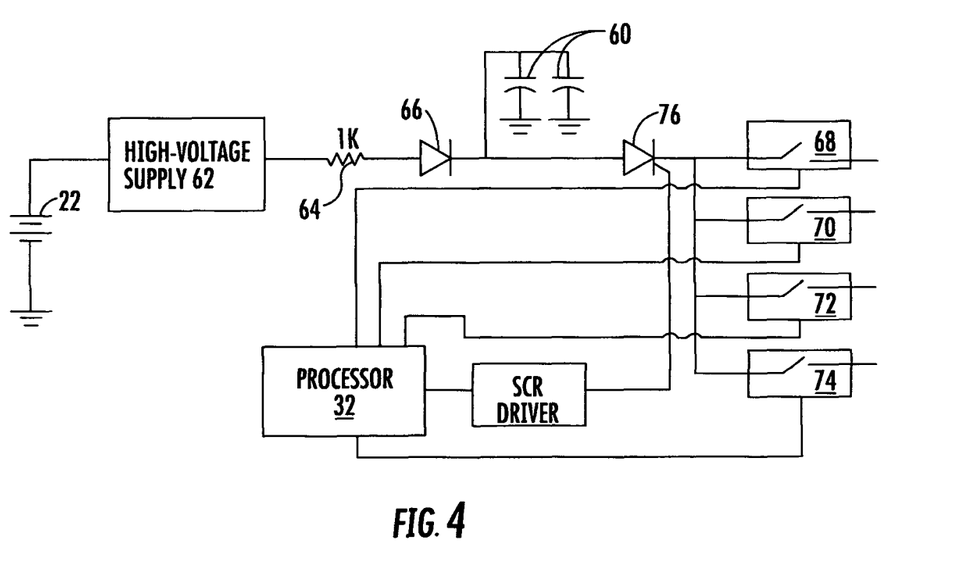
FIG. 4 is a schematic view of the over-voltage generator.

FIG. 4 shows a part of the circuit used to damage the nonvolatile memory. High voltage supply 62 is powered by battery 22 and charges capacitors 60 to 60 volts through resistor 64 and diode 66. When a destruct signal is generated, the high voltage from capacitors 60 is connected to relays 68, 70, 72, and 74 through SCR 76. Relays 68-74 are individually energized by processor 32 to switch the high voltage to individual nonvolatile memory data lines and the nonvolatile memory power input. Applying the high voltage from capacitors 60 to the data lines and to the power supply input, and discharging the energy stored in capacitors 60 through the data lines and power input of the nonvolatile memory damages the nonvolatile memory so that the memory cannot be accessed later to read the sensitive data contained therein. Capacitors 60 are recharged between application of the high voltage so that each of the lines selected by relays 68-74 is destroyed. The charging time constant is approximately 1 second, so processor 32 waits 5 seconds between zapping individual items. Capacitors 60 sum to approximately 1000 microFarads of capacitance. This value was empirically determined to provide enough energy to permanently damage the chip that is zapped. Relay 68 is used to zap the nonvolatile memory power input. Relay 70 is used to zap a USB interface data line. Relay 72 is used to zap a nonvolatile memory data line. Relay 74 is used to zap an RAM memory data line.

Upon completing the destruct sequence above, computer system 12 and its associated memory are no longer functional and the sensitive data stored in nonvolatile memory is no longer accessible.

Figure 5:
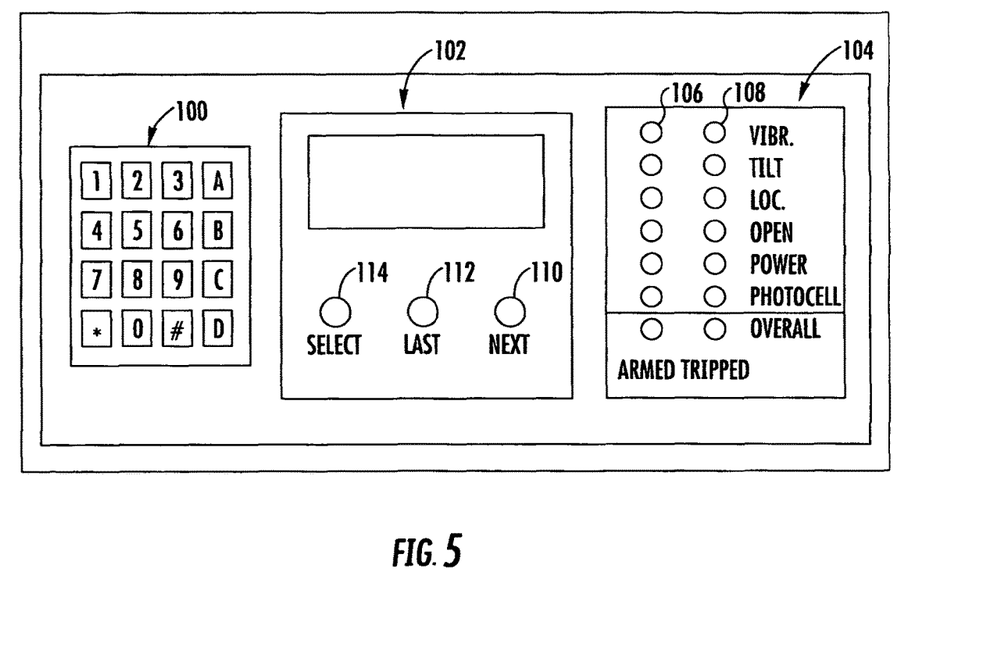
FIG. 5 depicts the front panel and user interface.

FIG. 5 shows the front panel 30 of Security environment 10. Front panel 30 is used by an operator to select the intrusion profile and to enter a code to cancel a destruct sequence. Front panel 30 is divided into three sections, the keyboard 100, the display 102 and the status display 104. Keyboard 100 is used to cancel and activate destruct signal. Display 102 displays input from keyboard 100 and is used to interactively define the intrusion profile. Status display 104 shows the currently selected intrusion profile.

Status display 104 has two columns of LEDs, the armed column and the tripped column. The LEDs in armed column 106 indicate that the associated intrusion sensor is enabled in the current intrusion profile. The LEDs in the tripped column indicate that the associated intrusion sensor has detected an intrusion condition. A sensor must be armed for the destruct signal to be triggered by the associated intrusion condition. The armed LED in the bottom row indicates whether any sensors are armed in the current intrusion profile. The tripped LED in the bottom row indicates that a destruct signal is active, i.e., that one or more intrusion sensors are both armed and are detecting an intrusion condition.

While interactively defining the intrusion profile, display 102 displays the current sensor. Pressing button 110 scrolls forward in the list of sensors displayed in status display 104 to the next sensor. Pressing button 112 scrolls back in the list of sensors display in status display 104 to the previous sensor. Pressing button 114 toggles the armed status of the currently displayed intrusion sensor.

Once a destruct signal is generated, unless the destruct is immediate, beeper 34 sounds and an operator who knows the cancel code has 1 minute to enter the code before the destruct sequence begins. There is also a profile code which enables modification of the intrusion profile.

Figure 6:
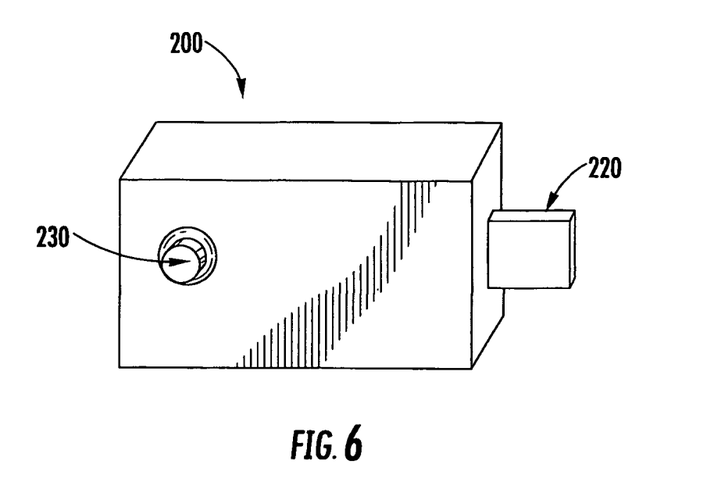
FIG. 6 depicts the thumb drive embodiment.

In another embodiment of the current invention, refer now to FIG. 6, self-destructing thumb drive 200. Thumb drive 200 is used to store computer data, which may be sensitive data. The use of thumb drives to provide computers with easily transportable storage or as backup data storage is well known in the art. Self-destructing thumb drive 200 operates much as a common thumb drive for the purpose of storing and retrieving data when USB connector 220 is plugged into a compatible computer. Button 230 provides an input to allow a destruction request sequence to be entered into thumb drive 200 for the purpose of protecting sensitive data contained therein. Entry of the destruction request sequence would generally be invoked when thumb drive 200 is not plugged into a computer and is being used for backup or transport.

Figure 7:
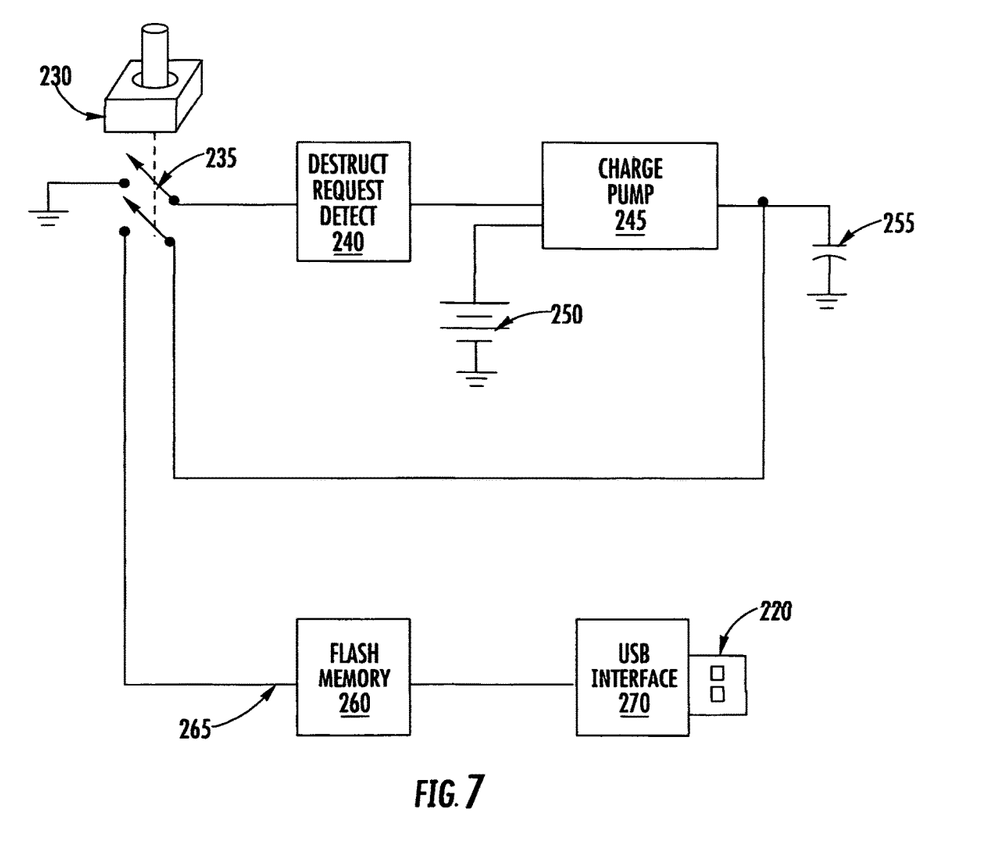
FIG. 7 depicts a block diagram of the thumb drive embodiment.

Referring to FIG. 7, data storage is accomplished via USB connector 220, USB interface 270 and flash memory 260. The embodiment uses flash memory and a USB interface, but other nonvolatile memory technologies could be used in place of the flash memory and other interfaces could be used in place of USB within the broad outline of the current invention.

During activation of the self-destructing aspect of thumb drive 200, switch 235 is activated through button 230 for entry of the destruction request sequence. In the embodiment, the destruction request sequence consists of three closures of switch 235. Entry of two switch closures within one second is detected by destruct request detector 240, which turns on charge pump 245. Charge pump 245 uses energy from battery 250 and charges capacitor 255 up to 80 volts. The third switch closure of switch 235 conveys the voltage from capacitor 255 to data line 265 of flash memory 260, destroying flash memory 260. The value of capacitor 255 was chosen as 200 microfarad to provide enough energy to burnout data line 265. Charge pump 245 uses a flyback circuit to provide current at 80 volts to charge capacitor 255. Flyback technology is well known in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer security environment for protecting sensitive data stored in nonvolatile memory in a computer system, the computer system disposed within the computer security environment, the computer security environment comprising:
   a. an enclosure defining a perimeter of the security environment;
   b. one or more intrusion sensors, said sensors disposed within said enclosure, each of said sensors operable to detect a security environment intrusion condition and send a detection signal;
   c. an over-voltage generator, said over-voltage generator comprising a high-voltage supply charging a capacitor through a resistor, said capacitor connected to the nonvolatile memory through a silicon controlled rectifier, said generator operable to apply an over-voltage condition to the nonvolatile memory, through said silicon controlled rectifier, upon receiving a destruct signal; and
   d. a controller operable to receive said detection signals and in communication with said over-voltage generator, operable to produce said destruct signal.

2. The computer security environment as claimed in claim 1, further including an intrusion profile defining the detection signals armed to produce said destruct signal, and wherein said controller evaluates said detection signals against said intrusion profile to produce said destruct signal.

3. The computer security environment as claimed in claim 2,
   wherein the nonvolatile memory includes one or more data lines and wherein said over-voltage generator applies an over-voltage condition to the one or more data lines.

4. The computer security environment as claimed in claim 2, wherein the nonvolatile memory includes a power input, and wherein said over-voltage generator applies an over-voltage condition to the power input.

5. The computer security environment as claimed in claim 2, wherein the nonvolatile memory includes one or more data lines and a power input, and wherein said over-voltage generator applies an over-voltage condition to the one or more data lines and to the power input.

6. The computer security environment as claimed in claim 2, wherein said enclosure includes a lid, and wherein said one or more intrusion sensors includes a switch that detects removal of said lid.

7. The computer security environment as claimed in claim 2, wherein said one or more intrusion sensors includes a vibration sensor to detect an intrusion condition of trying to gain access to said enclosure.

8. The computer security environment as claimed in claim 2, further including a power input for powering the computer security environment, and wherein said one or more intrusion sensors includes a power monitor to detect loss of power input to the security environment.

9. The computer security environment as claimed in claim 8, further including a battery for providing power to the security environment upon loss of power input, and wherein said one or more intrusion sensors includes a low battery level detector.

10. The computer security environment as claimed in claim 2, wherein said one or more intrusion sensors includes a tilt sensor for detecting an intrusion condition of tilting of said enclosure.

11. The computer security environment as claimed in claim 2, wherein said one or more intrusion sensors includes a location sensor for detecting an intrusion condition of movement of said enclosure.

12. A computer security environment for protecting sensitive data stored in nonvolatile memory within a computer system, the nonvolatile memory having one or more data lines and a power input, the computer system disposed within the computer security environment, the computer security environment comprising:
 a. an enclosure defining a perimeter of the security environment;
 b. one or more intrusion sensors, said sensors disposed within said enclosure, each of said sensors operable to detect a security environment intrusion condition and send a detection signal;
 c. an over-voltage generator, said over-voltage generator comprising a high-voltage supply charging a capacitor through a resistor, said capacitor connected to the nonvolatile memory through a silicon controlled rectifier, said over-voltage generator operable to destroy the nonvolatile memory by applying an over-voltage condition to the one or more data lines and power input, through said silicon controlled rectifier, upon receiving a destruct signal;
 d. a user interface, the user interface operable to select an intrusion profile defining the detection signals armed to produce said destruct signal; and
 e. a controller in communication with the user interface, the one or more intrusion sensors, and the over-voltage generator, the controller operable to evaluate said detection signals against said intrusion profile and produce a destruct signal.

13. A method for protecting sensitive data stored in nonvolatile memory within a computer system in a security environment, the method comprising the steps of:
 a. deploying one or more intrusion sensors within said security environment, each of said sensors operable to detect a security environment intrusion condition and send a detection signal;
 b. evaluating said detection signals and generating a destruct signal;
 c. charging a capacitor through a resistor to a high voltage; and
 d. destroying the nonvolatile memory by connecting said capacitor to the nonvolatile memory through a silicon controlled rectifier, whereby an over-voltage condition is induced in the nonvolatile memory, upon receiving the destruct signal.

14. The method as claimed in claim 13, further including an intrusion profile defining the detection signals armed to produce said destruct signal, and wherein said evaluating said detection signals comprises evaluating said detection signals against said intrusion profile.

15. The method as claimed in claim 13, wherein the nonvolatile memory includes one or more data lines and wherein said applying an over-voltage condition to the nonvolatile memory comprises applying the over-voltage condition to the one or more data lines.

* * * * *